US009525594B2

(12) United States Patent
Hessenauer et al.

(10) Patent No.: US 9,525,594 B2
(45) Date of Patent: Dec. 20, 2016

(54) METHOD FOR COMBINED UNICAST/MULTICAST SOFTWARE TRANSMISSION

(75) Inventors: Udo Hessenauer, Neckargemuend (DE); Thomas Husterer, Bammental (DE); Ulrich Kramer, Angelbachtal (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 507 days.

(21) Appl. No.: 13/234,538

(22) Filed: Sep. 16, 2011

(65) Prior Publication Data
US 2012/0072901 A1 Mar. 22, 2012

(51) Int. Cl.
H04L 12/24 (2006.01)
H04L 29/08 (2006.01)
G06F 9/445 (2006.01)
H04L 12/18 (2006.01)

(52) U.S. Cl.
CPC ............ H04L 41/082 (2013.01); G06F 8/60 (2013.01); G06F 8/64 (2013.01); H04L 12/1836 (2013.01); H04L 67/34 (2013.01)

(58) Field of Classification Search
CPC .... H04L 41/082; H04L 12/1836; H04L 67/34; G06F 8/60; G06F 8/64
See application file for complete search history.

(56) References Cited

U.S. PATENT DOCUMENTS

| 5,519,704 | A | * | 5/1996 | Farinacci et al. | ............ 370/402 |
| 5,727,002 | A | | 3/1998 | Miller et al. | |
| 6,029,196 | A | * | 2/2000 | Lenz | .......... G06F 8/61 709/203 |
| 7,328,347 | B2 | | 2/2008 | Keim et al. | |
| 7,844,721 | B2 | * | 11/2010 | Lee | ............ G06F 8/65 709/230 |
| 7,950,063 | B2 | | 5/2011 | Oelsner | |
| 8,230,097 | B2 | * | 7/2012 | Rachwalski et al. | ......... 709/231 |
| 8,250,223 | B2 | * | 8/2012 | Chen | ............ 709/228 |
| 8,401,032 | B2 | * | 3/2013 | Hundscheidt et al. | ........ 370/432 |
| 2002/0001310 | A1 | * | 1/2002 | Mai et al. | ............ 370/390 |

(Continued)

FOREIGN PATENT DOCUMENTS

DE 44 38 698 A1 5/1996
EP 1748360 A1 1/2007

OTHER PUBLICATIONS

German Patent and Trademark Office Search Report, Dated Jun. 6, 2011.

*Primary Examiner* — Van Nguyen
*Assistant Examiner* — Jacob Dascomb
(74) *Attorney, Agent, or Firm* — Laurence A. Greenberg; Werner H. Stemer; Ralph E. Locher

(57) ABSTRACT

A method for transmitting software from a central computer to at least two further computers, includes connecting the central computer and the at least two further computers with a communication link for data transmission. The central computer sets up a connection to the at least two further computers and requests properties of the at least two further computers. The central computer transmits to the at least two further computers, which have been identified as having multicast capability, those parts of the software which are suitable for multicast transmission. The central computer sets up a unicast connection to the at least two further computers for those parts of the software not suitable for multicast transmission.

8 Claims, 2 Drawing Sheets

(56) References Cited

U.S. PATENT DOCUMENTS

| | | | |
|---|---|---|---|
| 2002/0191612 A1* | 12/2002 | Curtis | 370/392 |
| 2004/0194143 A1* | 9/2004 | Hirose | 725/97 |
| 2005/0259682 A1* | 11/2005 | Yosef et al. | 370/468 |
| 2006/0164257 A1 | 7/2006 | Giubbini | |
| 2006/0235949 A1 | 10/2006 | Tai et al. | |
| 2006/0239195 A1 | 10/2006 | Camins et al. | |
| 2007/0168523 A1* | 7/2007 | Jiang et al. | 709/228 |
| 2007/0211720 A1* | 9/2007 | Fuchs et al. | 370/390 |
| 2007/0244982 A1 | 10/2007 | Scott, III et al. | |
| 2009/0013079 A1 | 1/2009 | Dickens et al. | |
| 2009/0201929 A1* | 8/2009 | Patel | 370/390 |
| 2010/0262961 A1* | 10/2010 | Pak et al. | 717/173 |
| 2011/0099545 A1* | 4/2011 | Lee et al. | 717/172 |
| 2011/0099546 A1* | 4/2011 | Polland et al. | 717/173 |
| 2011/0106961 A1* | 5/2011 | Glasser et al. | 709/231 |

\* cited by examiner

METHOD FOR COMBINED UNICAST/MULTICAST SOFTWARE TRANSMISSION

CROSS-REFERENCE TO RELATED APPLICATION

This application claims the priority, under 35 U.S.C. §119, of German Patent Application DE 10 2010 045 683.7, filed Sep. 16, 2010; the prior application is herewith incorporated by reference in its entirety.

BACKGROUND OF THE INVENTION

Field of the Invention

The present invention relates to a method for transmitting software from a central computer to at least two further computers, wherein the central computer and the at least two further computers can be connected through a communication link for data transmission.

In many machines and equipment which have a software-controlled electronic control apparatus and an Internet connection, the control software, such as the firmware or the operating system, is updated at regular intervals by software which is transmitted to the machines and equipment from a central computer of the manufacturer of the machines and equipment or of the software manufacturer over the Internet and over any local intranet which is present. When the software has been transmitted to the appliances completely, the old software is replaced by the new software and the machine can use the new firmware or the new operating system. In the case of the transmission for the purpose of updating the software, a basic distinction is drawn between two transmission methods, the so-called multicast method and the so-called unicast method. The multicast method involves the central computer sending all machines and equipment the same software, so that all of the subscribers are supplied with the same software data. The unicast method involves the central computer setting up an individual connection to each subscriber and thus being able to send each subscriber an individual piece of software.

U.S. Pat. No. 5,727,002 discloses a method for transmitting software from a central computer to a plurality of computers that are to be updated, in which the multicast method for data transmission and the unicast method for data transmission are combined with one another. In that case, the software to be transmitted is transmitted from the central computer to the computer that is to be updated block by block in small packets, as is normally customary for Internet connections based on the TCP/IP protocol or in mobile radio in the case of packet-oriented data transmission based on GPRS or UMTS. First of all, the central computer in that instance transmits the data packets to all connected subscribers using the multicast method. If one of the connected subscribers responds to a transmitted data packet with a negative acknowledgement, the central computer knows that the negatively acknowledged data packet needs to be sent again. There may be various reasons for that negative acknowledgement: either the packet has not been received at all or a transmission error has occurred for one or more subscribers during reception of the packet. When the central computer has transmitted all the data packets from the entire software, a second transmission round takes place in which only the data packets which have not been received correctly are sent. That transmission of the data packets which have not been received correctly is then effected using the unicast method, since only the data packets which have not been transmitted directly in each case are sent individually to the affected subscriber.

However, that method has the drawback that it is not suitable for sending software to a plurality of recipients, where at least some of the software is individualized for the recipients. However, that case arises frequently when updating control software for printing machines and machines in the graphics industry, since printing machines are supplied in the widest variety of configurations with a different number of printing units, varnishing units and control components, including on the basis of the desired degree of automation, and hence the control software is at least to some extent individual for almost every printing machine. That means that when the firmware or the operating system of a printing machine controller is interchanged, at least small portions of that software being interchanged are not identical, which means that it is necessary to take those individual software portions into account when the software is updated.

SUMMARY OF THE INVENTION

It is accordingly an object of the invention to provide a method for transmitting software including standardized software portions and software portions which are individually customized to a recipient, which overcomes the hereinafore-mentioned disadvantages of the heretofore-known methods of this general type and which allows the most resource-saving and fastest possible data transmission from a central computer to a plurality of connected computers.

With the foregoing and other objects in view there is provided, in accordance with the invention, a method for transmitting from a central computer to at least two further computers. According to the invention, the central computer and the at least two further computers can be connected by a communication link for the purpose of data transmission. The central computer sets up a unicast connection to the at least two further computers and requests properties of the at least two further computers. The central computer opens an additional multicast channel to the at least two further computers according to the gathered properties. Both channels are simultaneously available. The central computer transmits to the at least two further computers, which have been identified as having multicast capability, those parts of the software which are suitable for multicast transmission using the multicast channel. Some portions not suitable for multicast transmission are transmitted using the unicast channel.

The method according to the invention is used for transmitting software, such as firmware or an operating system. Large parts of the software is identical for each recipient and is transmitted to each computer using firmware or an operating system. Other parts of the software may be different for each recipient are not transmitted to all of the computers that are to be updated, but rather are transmitted only on an individualized basis to single recipients. In principle, this method is suitable for transmitting any software which is at least to some extent customized to computers that are to be updated. In this case, the software that is to be updated is transmitted from a central computer, which may be the control computer for the printing machine, to the local computers that are to be updated in the printing machine. The machines and equipment are situated near the operators of the equipment and machines, with the software being able to be transmitted to the control computer of the printing machine by Internet or through the use of a data storage medium. In the printing machine, the software is transmitted from the control computer to the local module computers through a network such as an Ethernet or CAN bus.

The method according to the invention involves the central computer first of all setting up a network connection to the further computers receiving the software at the start of the transmission of the software, and requesting the properties or configuration of the further computers. The further computers acknowledge their properties or configurations to the central computer, so that the latter knows the properties and configurations of the further computers. On the basis of the acknowledged properties and configurations, the central computer now determines which software parts are transmitted by using the multicast method and which software parts are transmitted by using the unicast method. In the multicast method, those software parts which are identical for all computers are transmitted to the further computers. In the unicast method, those software parts which are configured individually at least for some computers are transmitted. Hence, all computers with identical software parts are supplied by using the multicast method for these identical parts and the individual software parts are transmitted by using the unicast method. This practice ensures that as much software as possible is transmitted by using the resource-saving and time-saving multicast method, since only the individual software parts need to be transmitted by using the unicast method.

In accordance with another mode of the invention, the multicast and unicast connections between the central computer and the further computers exist simultaneously. In this case, the central computer uses the network to set up a unicast connection to each local computer in the machine and, additionally, sets up multicast connections in parallel to the local computers. In this way, the multicast and unicast transmissions exist in parallel and can therefore be used in a particularly time-saving manner.

In accordance with a further mode of the invention, the transmission of the software involves the central computer repeatedly changing back and forth between the unicast transmission and multicast transmission modes. In this case too, multicast and unicast connections can first of all be set up in parallel, individual software parts are transmitted using the unicast method identical parts are transmitted using the multicast method. This can then be repeated a plurality of times until the complete software has transmitted to the connected further computers.

In accordance with an added mode of the invention, in addition, the central computer divides the parts of the software into blocks and transmits them block by block to the further computers, wherein the maximum block size corresponds to the minimum of the maximum block size supported by the further computers. Even the parts of the software usually have a file size which cannot be transmitted in one packet or block. Furthermore, large blocks have the drawback that if one block is transmitted incorrectly then the entire large block needs to be transmitted again, which accordingly takes up time. Therefore, the blocks that are to be transmitted should not be too large. However, the maximum block size is prescribed by the maximum block size of the connected further computers. Since at least portions of the software are transmitted using the multicast method, it is first of all necessary to ascertain the minimum of the maximum block size which is supported by the further computers. Otherwise, the block size would be too large for at least one of the further computers, as a result of which that further computer cannot receive the excessively large blocks of the software which are transmitted using the multicast method. When the minimum of the maximum block size supported by the further computers has thus been ascertained, the central computer breaks down the software into precisely this maximum block size, which corresponds to the minimum of the maximum block size supported by the further computers. This ascertainment of the maximum permissible block size takes place at the start of the data transmission process before the first sending of the software using the multicast or unicast method.

In accordance with an additional mode of the invention, an individual acknowledgment by each of the further computers contains a signal for termination of the transmission or a signal for the renewed reception standby state. After every transmitted block of software to one of the further computers, the further computer either reports an error by reporting back a termination signal or reports its renewed reception standby state if all data have been transmitted correctly. In this manner, the central computer learns which computers have experienced errors during the data transmission in the network.

In accordance with a concomitant mode of the invention, in this case, with particular advantage, the central computer excludes from the multicast transmission each of the further computers which has signaled a termination or has not sent an acknowledgement within the prescribed maximum time, and continues the transmission of further blocks of the software for multicast transmission with the remaining further computers. In this case, the invention prescribes a maximum response time for an acknowledgement from the further computers to the central computer. If one of the further computers sends a termination signal within this time period or does not send an acknowledgement at all within this prescribed maximum time then it can be assumed that an error has occurred in the data transmission. In this case, a data packet which has possibly been sent beforehand using the multicast method would need to be repeated for the multicast transmission. However, this would disturb the execution for the other computers, as a result of which in this preferred embodiment that computer which has not responded or signaled a termination is excluded from the multicast transmission, so that the transmission of further blocks of the software for multicast transmissions can be continued uninfluenced with the remaining further computers. The further computers excluded from the multicast method can then be supplied with the erroneously transmitted blocks of the software again using the unicast method after the conclusion of the multicast transmissions to the other computers. It is also possible to re-include those computers which do not respond or which signal an error in the next round of multicast transmission. In this case, the central computer notes which computers have reported an error at what time during a multicast method and supplies these computers with those blocks of the software which are reported to have been received incorrectly again at the end of the data transmission.

The great advantage of the method according to the invention is that software parts which are suitable for multicast transmission do not need to be transmitted redundantly and the software can nevertheless have individual components.

Other features which are considered as characteristic for the invention are set forth in the appended claims.

Although the invention is illustrated and described herein as embodied in a method for combined unicast/multicast software transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
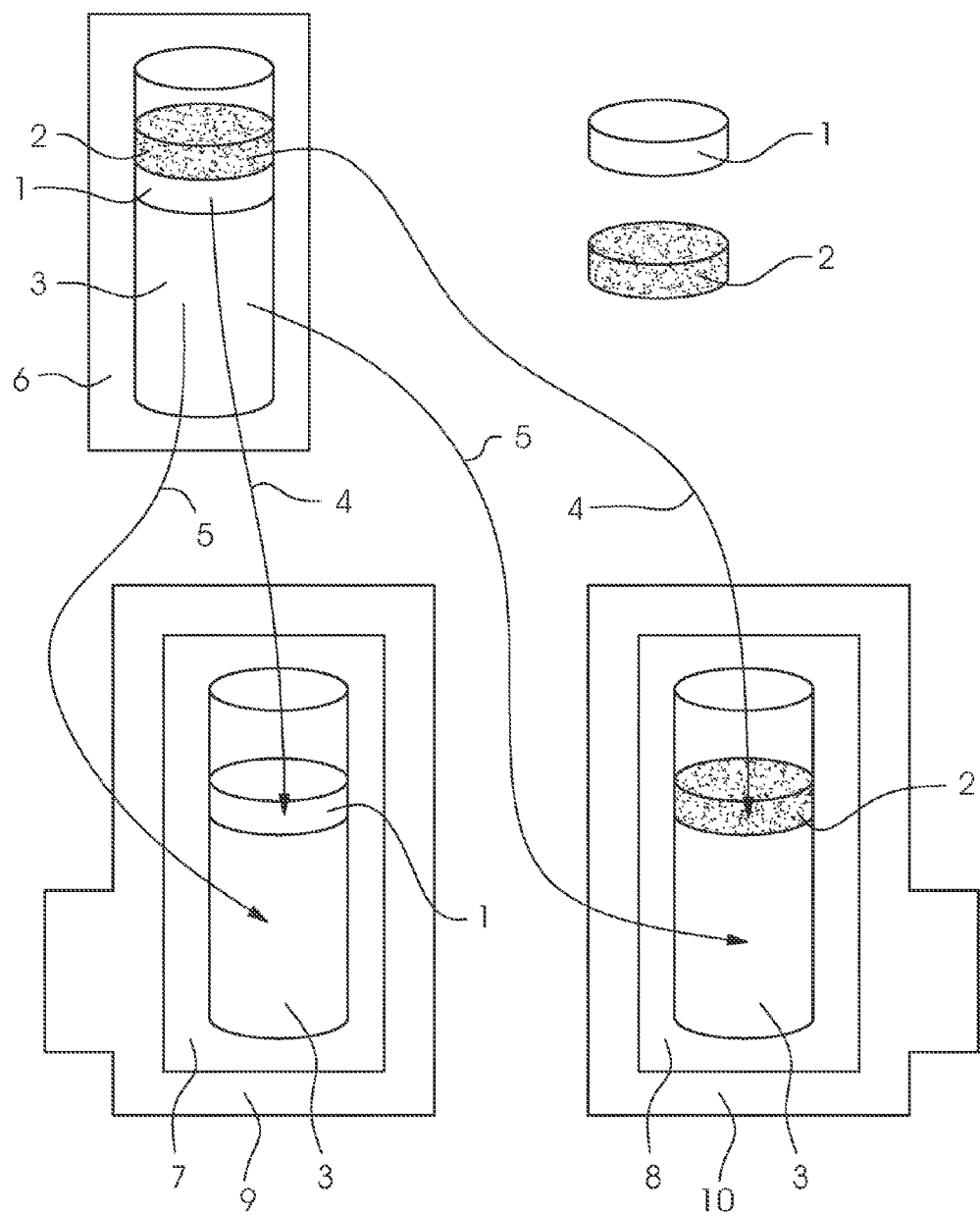
FIG. 1 is a block diagram of a network including a central control computer and further connected computers which receive a software update from the central control computer.

Referring now to the figures of the drawings in detail and first, particularly, to FIG. 1 thereof, there is seen a diagrammatic illustration of a central control computer 6 in a printing machine and, by way of example, two further local computers 7, 8 in two printing units 9, 10 which are supplied with a software update by the central control computer 6. In this case, the central computer 6 is the control computer 6 in a printing machine, in which the control computer transmits software updates for firmware to the computers 7, 8 in the printing units 9, 10 through a network connection. The control computer 6 receives the software update over the Internet through remote maintenance or through a data storage medium. The computers 7, 8 are connected to the control computer 6 through a network connection such as an Ethernet or CAN bus. The firmware sent by the control computer 6 can be divided in parts 1, 2, 3. As can be seen from FIG. 1, the majority of the software for the computers 7, 8 is identical and is referred to as a multicast portion 3. However, since printing units 9, 10 are sold in the widest variety of configurations and with the widest variety of control components, there are also software parts which are configured individually for each printing unit 9, 10. In this case, the first software portion 1 is customized to the properties of the first printing unit 9, while the second software portion 2 is customized to the properties of the second printing unit 10.

According to the present invention, the first portion 3 is now transmitted to all of the computers 7, 8 using multicast, while the customized portion 1 is transmitted only to the computer 7 in the first printing unit 9 and the portion 2 is transmitted only to the computer 8 in the second printing unit 10. It is only when all of the parts 1, 2, 3 have been completely transmitted to the respective computer 7, 8 that the previous firmware in the further computers 7, 8 is replaced by the new firmware including the software parts 1, 2, 3 and thus the controller for the printing units 9, 10 is updated. Both a multicast transmission 5 and a unicast transmission 4 can be performed by using the same network connection. The present invention is naturally not limited to two local computers 7, 8, but rather can be implemented with any number of other computers 11 (see FIG. 2). It is thus likewise possible to supply a large number of computers 7, 8, 11 with new firmware in a time-saving fashion.

Figure 2:
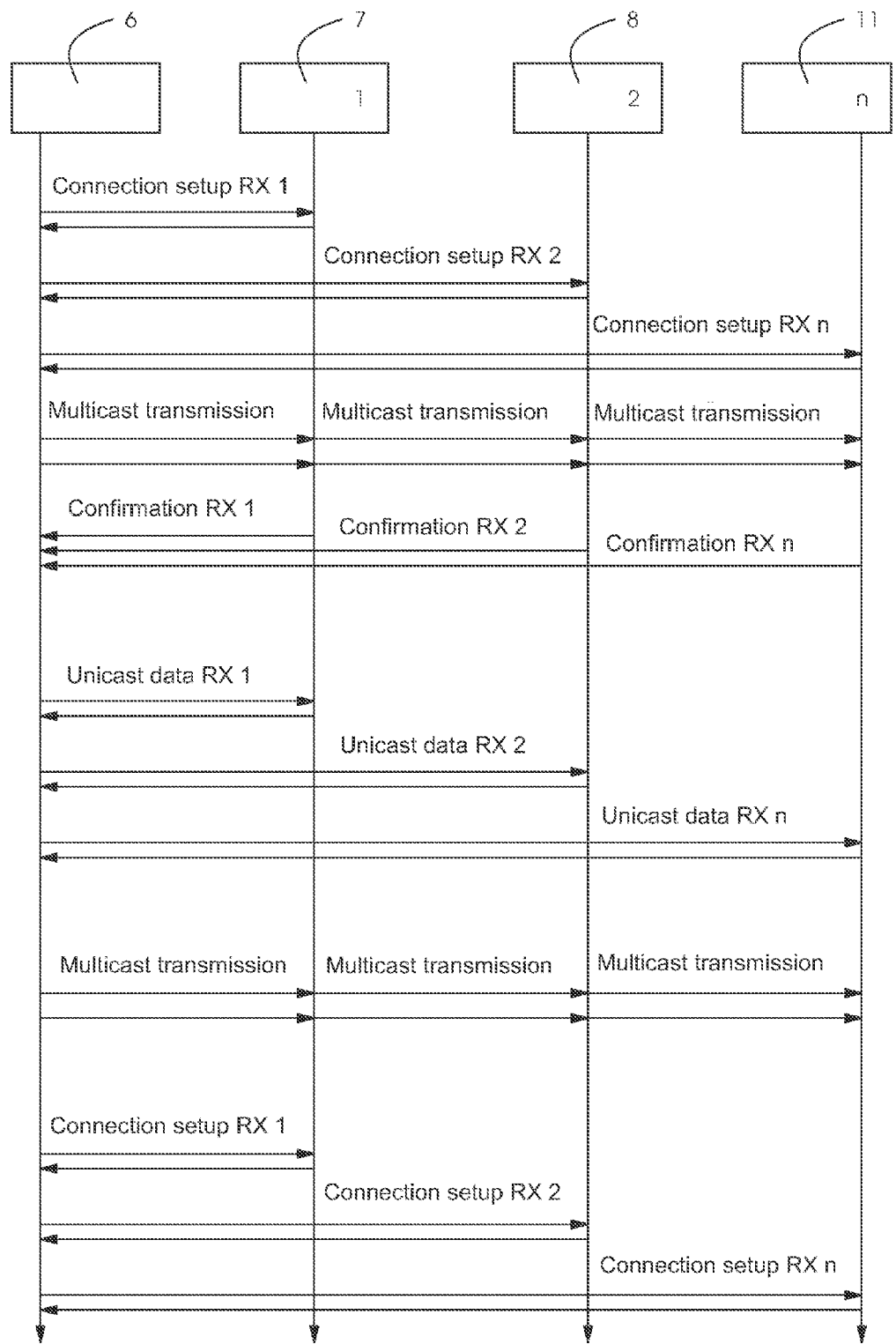
FIG. 2 is a flow chart showing an execution of the transmission of software using multicast and unicast methods according to the invention.

FIG. 2 shows an execution of the transmission process for the software parts 1, 2, 3 from FIG. 1. At the top, subscribers such as the control computer 6, the first and second computers 7, 8 and any number of further computers 11 are shown. The number of computers 7, 8, 11 is unimportant here. As in FIG. 1, it is assumed for the software distribution in FIG. 2 that the firmware to be updated is largely identical. In this case, the control computer 6 distributes the new firmware in accordance with the execution processes in FIG. 2. To this end, the control computer 6 first of all sets up a unicast connection 4 to each computer 7, 8, 11 in order to write to the program memory. This produces a data stream object to which it is possible to write sequentially and which results in writing to the program memory in the computers 7, 8, 11. Following this initialization, the control computer 6 attempts to connect the computers 7, 8, 11 to form a multicast group. It does this using a protocol command that is defined in the data stream object. This command transmits all relevant connection parameters for the multicast connection 5. The addressed computer 7, 8, 11 responds to this command by notifying the control computer 6 of its properties, which also include whether it actually has multicast capability and how large its maximum receivable block size possibly is. All computers 7, 8, 11 which the control computer 6 has identified as having multicast capability are now located in the multicast group. At the same time, a unicast communication link 4 exists which is represented in the control computer 6 by a single data stream object.

As already mentioned, the basic portions of the firmware for the computers 7, 8, 11 are identical. There is merely a small portion of, by way of example, 200 bytes in comparison with 2.5 megabytes for the entire firmware which is individualized as a so-called image header. This image header contains an entry for the location at which the computer 7, 8 is installed in the printing machine, for example. This individualized image header does not have multicast capability and is transmitted using a unicast method 4. The control computer 6 transmits the start of the firmware to all participating computers 7, 8, 11 in the multicast group using the multicast method 5. In this case, all data are sent only once in each case and are simultaneously received by all members of the multicast group. The individualized portion of the firmware is transmitted to each computer 7, 8, 11 individually using the unicast method 4. The rest of the firmware is then transmitted to all computers 7, 8, 11 simultaneously, again using the multicast method 5. This process can be repeated as often as desired. When the transmission of all software parts 1, 2, 3 has ended, the multicast connections 5 and unicast connections 4 are closed and the firmware transmission is concluded.

In the case of the block by block transmission of the software parts 1, 2, 3, the maximum block size corresponds to the minimum of the maximum block size supported by all involved computers 7, 8, 11. In this case, provision is made for the last fragment of each block to be followed by the control computer 6 awaiting a prescribed maximum time for an individual acknowledgement by each computer 7, 8, 11. The acknowledgement may signal termination of the transmission or the renewed reception standby state of the computers 7, 8, 11. The block configuration is basically dependent on error recognition algorithms which the computer 7, 8, 11 can use to identify transmission errors. Following each multicast transmission process, the control computer 6 removes from the multicast group—at the end of a fragment of a block that is to be transmitted—all computers 7, 8, 11 which have signaled a termination or which have not responded within a prescribed maximum time, and continues the transmission with the remaining computers 7, 8, 11 in the multicast group. The excluded computers can be supplied again with those blocks of the software parts 1, 2, 3 which have been reported as erroneous by using the unicast method 4 at a later time, if appropriate.

FIG. 2 shows how the connections are set up and when the confirmation by the computers 7, 8, 11 is provided. Depending on these confirmations and the properties of the software parts 1, 2, 3, the relevant software parts 1, 2, 3 are then transmitted from the control computer 6 to the further computers 7, 8, 11 using the multicast 5 and unicast 4 methods alternately. The great advantage of the invention is that software parts 3 which are the same for all computers 7, 8, 11 are transmitted using the multicast method 5, so that identical software part 3 do not have to be transmitted redundantly.

The invention claimed is:

1. A method for transmitting software from a central computer to at least two further computers, the method comprising the following steps:
   interconnecting the central computer and the at least two further computers with a communication link for data transmission;
   setting up a unicast connection from the central computer to the at least two further computers and, with the central computer, requesting properties from the at least two further computers, the at least two further computers sending their properties to the central computer;
   setting up an additional, simultaneously available multicast channel to the at least two further computers according to said properties sent to the central computer by the at least two further computers;
   transmitting parts of the software that are the same for the at least two further computers and, therefore, being suitable for multicast transmission, from the central computer to the at least two further computers having been identified as having multicast capability using the multicast channel, wherein each of the at least two further computers has a respective maximum supported block size;
   setting a maximum block size to a minimum block size determined between each respective maximum supported block size;
   dividing the software into blocks according to the set maximum block size; and
   transmitting parts of the software that are individualized for at least some of the at least two further computers and, therefore, are not suitable for multicast transmission, from the central computer to the at least two further computers using the unicast channel in parallel with the transmitting step of the multicast transmission, wherein the transmission is performed block by block based on the divided software blocks.

2. The method according to claim 1, wherein the software is an operating system or a piece of firmware including parts suitable for multicast transmission and including individualized parts for unicast transmission.

3. The method according to claim 1, which further comprises carrying out the transmission of the parts of the software by repeatedly changing the central computer back and forth between unicast transmission and multicast transmission modes.

4. The method according to claim 1, which further comprises causing the central computer to wait a prescribed time for an individual acknowledgement by each of the further computers, following a transmission of a last fragment of a block during the transmission of the software.

5. The method according to claim 4, which further comprises providing a signal for termination of the transmission or a signal for a renewed reception standby state, in the individual acknowledgment by each of the further computers.

6. The method according to claim 5, which further comprises:
   excluding from the multicast transmission by the central computer each of the further computers having signaled a termination or not having sent an acknowledgement within a prescribed maximum time; and
   continuing a transmission of further blocks of the software for multicast transmission with a remainder of the further computers.

7. The method according to claim 1, which further comprises providing the central computer and the further computers with an interface for a CAN bus or an Ethernet interface.

8. The method according to claim 1, wherein the further computers are local computers of a machine processing printing substrates.

* * * * *